(12) United States Patent
Kellner et al.

(10) Patent No.: US 12,327,879 B2
(45) Date of Patent: Jun. 10, 2025

(54) BATTERY DEVICE

(71) Applicant: Dr. Ing. h.c. F. Porsche Aktiengesellschaft, Stuttgart (DE)

(72) Inventors: Philipp Kellner, Renningen (DE); Dieter Schiebel, Korntal-Münchingen (DE); Immanuel Vogel, Kornwestheim (DE); Sascha Mostofi, Zeltingen (DE); Christopher Volkmer, Niefern-Öschelbronn (DE); Ralf Keller, Pforzheim (DE); Adrian Starczewski, Korntal-Münchingen (DE); Maximilian Müller, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 529 days.

(21) Appl. No.: 17/719,469

(22) Filed: Apr. 13, 2022

(65) Prior Publication Data
US 2022/0336916 A1  Oct. 20, 2022

(30) Foreign Application Priority Data

Apr. 14, 2021 (DE) ..................... 10 2021 109 302.3

(51) Int. Cl.
*H01M 50/375* (2021.01)
*H01M 10/613* (2014.01)
(Continued)

(52) U.S. Cl.
CPC ....... *H01M 50/375* (2021.01); *H01M 10/613* (2015.04); *H01M 10/625* (2015.04);
(Continued)

(58) Field of Classification Search
None
See application file for complete search history.

(56) References Cited

U.S. PATENT DOCUMENTS

| 11,283,121 | B1* | 3/2022 | Boecker | H01M 50/249 |
| 2010/0009244 | A1* | 1/2010 | Murata | H01M 10/613 |
| | | | | 429/53 |

(Continued)

FOREIGN PATENT DOCUMENTS

| CN | 105280861 A | 1/2016 |
| CN | 109411669 A | 3/2019 |

(Continued)

OTHER PUBLICATIONS

Office Action (The First Office Action) issued Dec. 14, 2023, by the State Intellectual Property Office of People's Republic of China in corresponding Chinese Patent Application No. 202210392047.1 and an English translation of the Office Action. (16 pages).

*Primary Examiner* — Scott J. Chmielecki
(74) *Attorney, Agent, or Firm* — Buchanan Ingersoll & Rooney PC

(57) ABSTRACT

A battery device has at least one battery module including a battery module housing, in which battery module housing battery cells are provided. The battery cells each have a cell envelope with a cell vent. The battery module housing has a battery-module housing wall with battery-module housing vents. The battery-module housing vents are respectively assigned a first closure arrangement, which first closure arrangement closes the assigned battery-module housing vent in a first state (Z1) and opens it in a second state (Z2), in order to allow at least partial venting of gas from the battery module housing through the assigned battery-module housing vent in the second state (Z2) of the first closure arrangement. At least two of the cell vents respectively lie opposite an assigned battery-module housing vent, at least in certain regions.

19 Claims, 3 Drawing Sheets

(51) Int. Cl.
   *H01M 10/625* (2014.01)
   *H01M 10/653* (2014.01)
   *H01M 10/6554* (2014.01)

(52) U.S. Cl.
   CPC ..... *H01M 10/653* (2015.04); *H01M 10/6554* (2015.04); *H01M 2220/20* (2013.01)

(56) References Cited

U.S. PATENT DOCUMENTS

| | | |
|---|---|---|
| 2012/0164490 A1 | 6/2012 | Itoi et al. |
| 2013/0071706 A1 | 3/2013 | Lee |
| 2014/0072840 A1* | 3/2014 | Favaretto ............ H01M 10/613 429/53 |
| 2015/0064514 A1 | 3/2015 | Wu et al. |
| 2018/0083329 A1* | 3/2018 | Acikgoez ............ H01M 50/242 |
| 2019/0229384 A1* | 7/2019 | Tasiopoulos ...... H01M 10/6554 |
| 2020/0307346 A1* | 10/2020 | Kalmbach ........... H01M 10/613 |
| 2021/0036284 A1 | 2/2021 | Schüssler et al. |
| 2021/0074971 A1* | 3/2021 | Kim ..................... H01M 50/30 |
| 2021/0074976 A1* | 3/2021 | Kim ..................... H01M 10/613 |
| 2021/0075075 A1* | 3/2021 | Kim ..................... H01M 10/613 |
| 2021/0226189 A1* | 7/2021 | Juzkow ............... H01M 10/486 |
| 2021/0288379 A1* | 9/2021 | Meredith ............ H01M 50/213 |
| 2022/0013848 A1* | 1/2022 | Zeng ................... H01M 50/531 |
| 2022/0166103 A1* | 5/2022 | Mee ................... H01M 10/0525 |
| 2022/0393265 A1* | 12/2022 | Akiyama ............... H01G 11/82 |
| 2023/0126915 A1* | 4/2023 | Yamane .............. H01M 50/209 429/53 |
| 2023/0178844 A1* | 6/2023 | Fujii ................... H01M 50/262 429/53 |
| 2023/0216126 A1* | 7/2023 | Yang ................... H01M 50/249 429/62 |

FOREIGN PATENT DOCUMENTS

| | | |
|---|---|---|
| CN | 209401710 U | 9/2019 |
| CN | 211980711 U | 11/2020 |
| CN | 112397845 A | 2/2021 |
| DE | 102017212223 A1 | 1/2017 |
| DE | 102017219176 A1 | 5/2019 |
| DE | 202019106023 U1 | 3/2020 |

* cited by examiner

BATTERY DEVICE

CROSS-REFERENCE TO RELATED APPLICATION

This application claims priority to German Patent Application No. 10 2021 109 302.3, filed Apr. 14, 2021, the content of such application being incorporated by reference herein in its entirety.

FIELD OF THE INVENTION

The invention relates to a battery device and to a vehicle with such a battery device. In the event of a battery fault, for example if a vehicle is involved in an accident, gases may escape. This is referred to as thermal runaway. In particular in the case of lithium-ion batteries, gases at high temperatures may then occur. In an extreme case, these gases may cause the occupants to be in danger and other sensitive components to be destroyed.

BACKGROUND OF THE INVENTION

DE 10 2017 219 176 A1, which is incorporated by reference herein, discloses a battery module for a high-voltage battery which has a cell pack with battery cells, which battery cells each have a cell housing with a venting element.

DE 20 2019 106 023 U1, which is incorporated by reference herein, discloses a container for receiving battery cells, which has a safety valve which is designed as a check valve, in order in the event of danger to discharge fire and electrolyte gases from the interior to the outside.

US 2012/0 164 490 A1, which is incorporated by reference herein, discloses a housing in which a plurality of cells with vents are provided, the housing being divided by a circuit board into a space for the cells and into a discharge duct, a gas being able to escape via the vents in the cells and subsequently via the exhaust duct.

US 2013/0 071 706 A1, which is incorporated by reference herein, discloses a battery with a battery module in which battery cells are provided, which battery cells have a vent, which battery module has a housing, which housing has an inlet and an outlet for air, with an opening and closing device being provided in the inlet.

US 2015/0 064 514 A1, which is incorporated by reference herein, discloses an energy storage device with a housing, in which housing a number of energy storage cells are arranged, between which barriers are provided, the housing having a bursting element that allows gases to be vented.

SUMMARY OF THE INVENTION

A battery device has at least one battery module, which battery module has a battery module housing, in which battery module housing battery cells are provided, which battery cells each have a cell envelope with a cell vent, which battery module housing has a battery-module housing wall with battery-module housing vents, which battery-module housing vents are respectively assigned a first closure arrangement, which first closure arrangement closes the assigned battery-module housing vent in a first state and opens it in a second state, in order to allow at least partial venting of gas from the battery module housing through the assigned battery-module housing vent in the second state of the first closure arrangement, at least two of the cell vents respectively lying opposite an assigned battery-module housing vent, at least in certain regions.

The close proximity of the cell vents to the battery-module housing vents allows the gas that occurs in the event of a fault in a battery cell to escape well directly from the battery module housing, and the risk of the surrounding, possibly intact battery cells being damaged by the hot gas is reduced. To put it another way, in the event of a fault, it is possible to delay or prevent propagation from battery cell to battery cell. The battery-module housing vents respectively assigned to the cell vents lead to shortened venting paths and at least to some extent to a separation of the venting paths of the individual battery cells. Moreover, the installation space requirement is reduced and the cooling capacity increased, because there is no requirement for a large void between the battery cells and the battery module housing.

According to a preferred embodiment, the battery device has at least two battery modules.

According to a preferred embodiment, each battery cell is provided with its own venting path. The venting paths are therefore formed separately from one another, and the risk of damage spreading is reduced.

According to a preferred embodiment, the first closure arrangements are designed to carry out a changeover from the first state to the second state in dependence on a parameter from the group of parameters consisting of:
 the pressure in the battery module housing,
 the temperature in the battery module housing, and
 the gas concentration of a predetermined gas in the battery module housing.

Examples of suitable first closure arrangements are disks of metal or plastic which are preferably structurally weakened in certain regions, in order when there is an excess pressure to allow locally defined destruction, closure arrangements of a material with a low melting temperature, pressure relief valves, controllable valves and films. Sensors for the gas concentration, which for example influence a controllable valve, may also be used. For example, the concentration of hydrogen or evaporated hydrofluoric acid may be measured.

According to a preferred embodiment, the first closure arrangement is designed so as in the first state to bring about an impermeability to media of the assigned battery-module housing vent. Consequently, no medium can escape through the assigned battery module vent. As a result, not only is the environment better protected from the battery, but also the battery is better protected from the environment.

According to a preferred embodiment, the cell vents are respectively assigned a second closure arrangement, which second closure arrangement closes the cell vent in a third state and opens it in a fourth state, in order to allow venting of gas from the battery cell through the assigned cell vent in the fourth state of the second closure arrangement. As a result, an escape of materials from the battery cell is reduced or prevented in the third state. In principle, the same devices as in the case of the first closure arrangement are suitable as the second closure arrangement.

According to a preferred embodiment, the battery device has a cooling plate, which cooling plate forms at least two of the first closure arrangements. As a result, on the battery module housing a cooling plate and the battery-module housing vents may preferably be provided on the same wall. The integration also makes this a low-cost solution.

According to a preferred embodiment, the cooling plate has a first cooling plate wall and a second cooling plate wall, which first cooling plate wall is at a distance from the second cooling plate wall, at least in certain regions, in order to allow a coolant flow between the first cooling plate wall and the second cooling plate wall. The cooling effect is thereby improved significantly, and the cooling plate walls can be made comparatively thin. This makes it easier for the first closure arrangements to be formed.

According to a preferred embodiment, the first cooling plate wall and the second cooling plate wall are in contact with one another in the region of at least a first closure arrangement. This contact allows a pressure acting by way of the battery-module housing vent to be transmitted well not only to the first cooling plate wall but also to the second cooling plate wall. If on the other hand coolant were present in this region, the pressure would be distributed over a large surface area. Moreover, the risk of the coolant escaping is reduced.

According to a preferred embodiment,
the first cooling plate wall, or
the second cooling plate wall, or
the first cooling plate wall and the second cooling plate wall have in the region of at least a first closure arrangement a reduced thickness, at least in certain regions, as compared with the maximum wall thickness of the respective cooling plate wall, in order to allow breaking open of the first closure arrangement under a predetermined pressure in the region of the reduced wall thickness. As a result, the destruction of the cooling plate that is desired in the event of a fault is spatially well-defined.

According to a preferred embodiment, the cooling plate is fastened to the battery module housing by an adhesive connection. This provides a secure connection, and it allows a good heat transfer.

According to a preferred embodiment, in the region between the cell envelopes and the battery module housing, heat-conducting paste is provided, at least in certain regions. As a result, the cooling of the battery cells is greatly improved. Filling with the heat-conducting paste may preferably take place by introducing it through at least one of the battery-module housing vents. If the battery-module housing vents are not being used for the filling, they may be temporarily closed by a stopper during the filling.

According to a preferred embodiment, the battery-module housing vents are free from heat-conducting paste, at least in certain regions. According to a preferred embodiment, the cell vents are free from heat-conducting paste, at least in certain regions. As a result, the transmission of pressure and the venting of gas can take place more directly and more quickly.

According to a preferred embodiment, the cell vents are at least to some extent assigned a covering part, which covering part has a covering-part through-opening, which covering part is arranged between the cell envelope and the battery module housing, at least in certain portions, and which covering-part through-opening lies on a first side opposite the assigned cell vent, at least in certain regions, and on a second side opposite the assigned battery-module housing vent, at least in certain regions, in order to allow venting of gas from the inside of a battery cell to the outside of the battery module housing along a straight path. As a result, the flow resistance during the venting is reduced as compared with the gas being vented along a meandering path.

According to a preferred embodiment, the cover-part through-opening is smaller than the battery-module housing vent. This allows a plug that is introduced through the battery-module housing vent to be placed against the rim of the cover-part through-opening during production and a seal to be formed in this way.

According to a preferred embodiment, the cover-part through-opening is smaller than the cell vent. As a result, the cover-part through-openings can be positioned offset in relation to one another, in order to allow battery-module housing vents that are offset in relation to one another. In this case it is not necessary to form the individual battery cells differently, but they can have comparatively large cell vents.

According to a preferred embodiment, the middle of the cover-part through-opening is offset from the middle of the cell vent. This allows the battery-module housing vents that are assigned to the cover-part through-openings to be easily arranged offset in relation to one another. The middle of any surface areas can be determined by the method of calculating centroids.

According to a preferred embodiment, the cover part is connected to the cell envelope, for example by an adhesive connection or a welded connection.

According to a preferred embodiment, the cover part lies against the cell envelope. As a result, the risk of heat-conducting paste entering is reduced.

According to a preferred embodiment, the cover part has a collar, which is designed to limit or prevent a displacement of the cover part in relation to the cell vent. As a result, the position of the cover part is well defined, and the impermeability between the cover part and the cell vent is increased.

According to a preferred embodiment, the form of the cover-part through-opening differs from the form of the cell vent. Thus, for example, the cover-part through-opening may be round and the cell vent may be in the form of a slot or be rectangularly formed. This allows a variable arrangement of the cover part in relation to the cell vent, and consequently in the case of identically formed battery cells a variation of the opening defined by the cover-part through-opening.

According to a preferred embodiment, at least three cell vents lie in one plane. This makes it easier for the battery-module housing vents to be arranged close together.

According to a preferred embodiment, at least one battery-module housing wall is parallel to this plane.

According to a preferred embodiment, the battery device has a first battery module with a first number of battery cells, in which first battery module the battery module housing has a second number of battery-module housing vents, the second number corresponding to at least 50% of the first number, preferably at least 80% and more preferably at least 100%. The greater the second number is proportionally, the less the surrounding battery cells are adversely affected by the gas escaping. With the percentages mentioned, an adverse effect on the adjacent battery cells in the event of a fault is reduced significantly. The second number is preferably at least as high as the first number, so the ratio is at least 100%. It is also possible for more battery-module housing vents to be provided for each battery cell, so that the ratio may also be for example 200% or 400%. If the provision of battery-module housing vents is not possible at one point of the battery housing, for example because of an external fastening, it is possible to dispense with them in this region. The battery is still much safer than in the case of a battery module with only one battery-module housing vent.

A vehicle has such a battery device. This increases the safety of the occupants and the vehicle in the event of damage or the event of a fault. The vehicle is for example a land vehicle or an aircraft, in particular a passenger car, a truck or a bus. The vehicle is preferably electrically operated or at least to some extent electrically operated.

According to a preferred embodiment, the cell vents are at least to some extent provided on the underside of the battery cells. According to a preferred embodiment, the battery-module housing vents are at least to some extent provided on the underside of the battery module housing. As a result, the risk of an adverse effect on occupants of the vehicle is greatly reduced. The gases occurring can be directed away from the vehicle.

According to a preferred embodiment, the battery cells are at least to some extent electrically connected by cell connectors, and the cell connectors are preferably provided on the upper side of the battery cells. As a result, the cell connectors are not in the way of the venting, and the risk of a short circuit or an arc being caused by the to some extent electrically conducting gases is reduced. Moreover, the risk of the insulation of the cell connectors or the power rails being damaged by the hot gases is reduced.

BRIEF DESCRIPTION OF THE DRAWINGS

Further details and advantageous developments of the invention will become apparent from the exemplary embodiments which are described in the text which follows and are shown in the drawings, and should not be understood as limiting the invention in any way, and from the dependent claims. In the drawings:

DETAILED DESCRIPTION OF THE INVENTION

Figure 1:
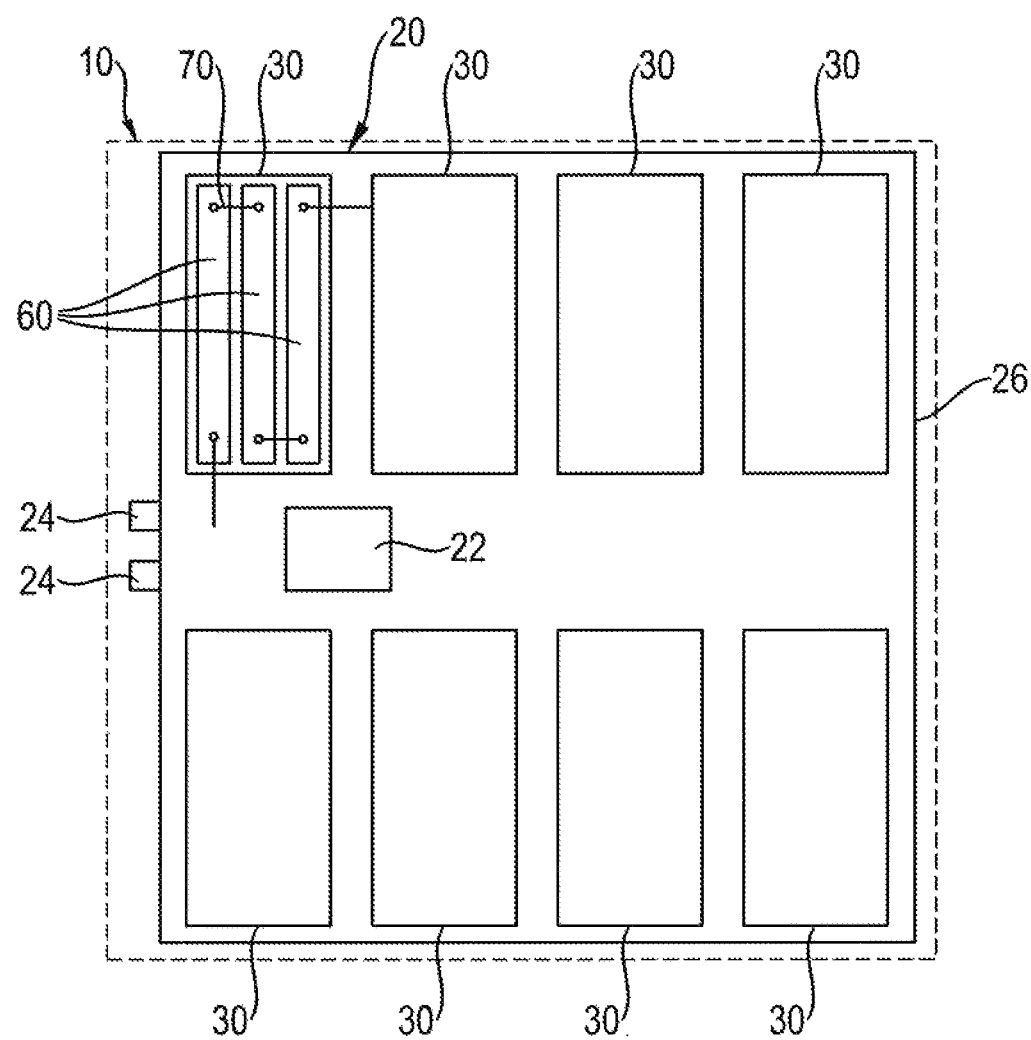
FIG. 1 shows a vehicle with a battery device in a schematic representation.

The figures are described in an inter-related and all-embracing manner. The same reference numerals denote the same elements and these elements are usually described only once.

FIG. 1 shows in a schematic representation a vehicle 10 with a battery device 20. The battery device 20 has a battery housing 26 with battery terminals 24, and in the battery housing 26 battery modules 30 and battery control electronics 22 are provided. The battery modules 30 each have battery cells 60, which are electrically connected to one another by way of cell connectors 70. By way of example, three battery cells 60 per battery module 30 are shown, but it is also possible for example for four, eight or 32 battery cells 60 to be provided per battery module 30.

Figure 2:
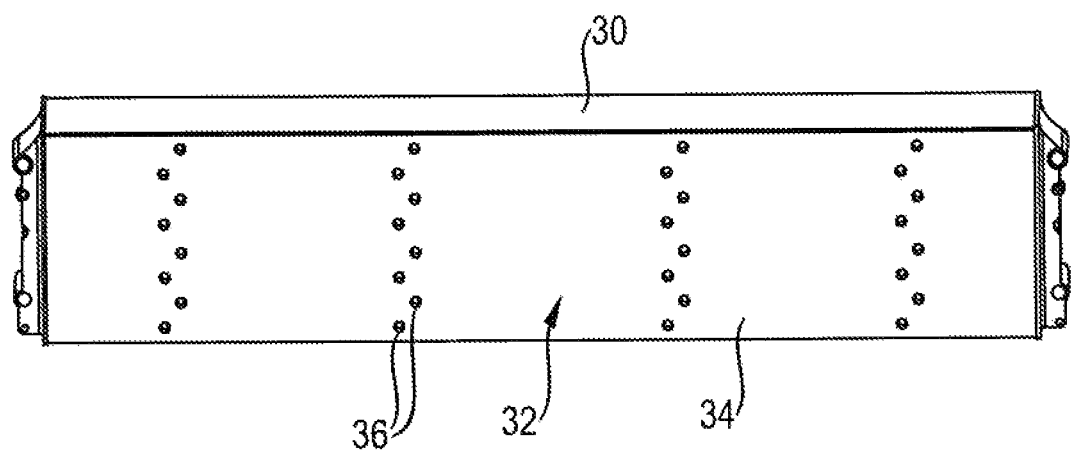
FIG. 2 shows a battery module of the battery device from FIG. 1 in a plan view.

FIG. 2 shows one of the battery modules 30 with a battery module housing 32. Provided on one battery-module housing wall 34 of the battery module housing 32 are battery-module housing vents 36, which allow venting of gas from the inside of the battery module housing 32 to the outside.

Figure 3:
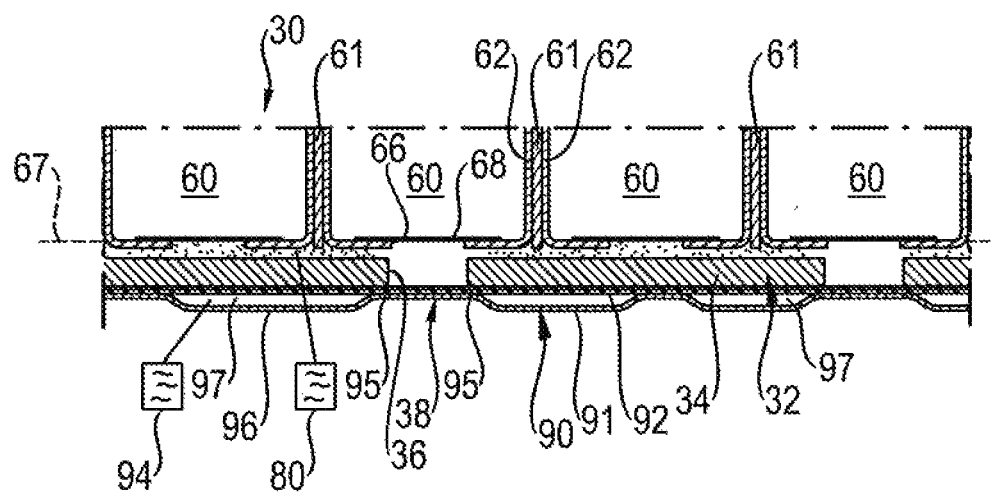
FIG. 3 shows a first embodiment of the battery module from FIG. 2 in a schematic cross section.

FIG. 3 shows a schematic cross section through the battery module 30 with four battery cells 60, between which partitions 61 are preferably provided. In the exemplary embodiment, the battery cells 60 are arranged stacked as a cell stack. The battery cells 60 each have an assigned cell envelope 62, which may be formed as a fixed housing or as a flexible pouch, as the latter is the case for example for a pouch cell. The cell envelope 62 has in each case a cell vent 66, through which for example gas occurring in the event of a defect of the battery cells 60 can escape from the battery cell 60. The cell vent 66 is preferably closed by a closure arrangement 68, to prevent any escape of the medium from the battery cell 60 during normal operation. The closure arrangement 68 is for example a film, which is formed so as to be less stable than the cell envelope 62 and is destroyed when there is excess pressure or high temperature. Alternatively, the cell vent 66 may also be formed without the closure arrangement 68, in order to allow rapid venting of gas in the event of a defect of the battery cell 60.

The battery module housing 32 has a battery-module housing wall 34, and in the battery-module housing wall 34 battery-module housing vents 36 are provided. The battery-module housing vents 36 are respectively assigned a first closure arrangement 38, which first closure arrangement 38 closes the assigned battery-module housing vent 36 in a first state Z1 and opens it in a second state Z2, in order in the second state Z2 of the first closure arrangement 38 to allow at least a partial venting of gas from the battery module housing 32 through the assigned battery-module housing vent 36.

In the exemplary embodiment, a cooling plate 90 is provided on the outside of the battery module housing 32. The cooling plate 90 has a first cooling plate wall 91 and a second cooling plate wall 92. The first cooling plate wall 91 is preferably at a distance from the second cooling plate wall 92, at least in certain regions, in order to form a cooling duct 97 between the cooling plate walls 91, 92 and to allow a coolant flow of coolant 94 between the first cooling plate wall 91 and the second cooling plate wall 92.

Preferably, the first cooling plate wall 91 and the second cooling plate wall 92 are in contact with one another in the region of at least a first closure arrangement 38. Preferably, the cooling plate 90 forms at least two of the closure arrangements 38. For this purpose, preferably the first cooling plate wall 91 and/or the second cooling plate wall 92 are formed in the region of at least one closure arrangement 38 with a reduced wall thickness 95, at least in certain regions, as compared with the maximum wall thickness 96. The reduced wall thickness may be formed for example by providing a notch on the first cooling plate wall 91 or on the second cooling plate wall 92. As a result, when there is excess pressure inside the battery module 30, the closure arrangement 38 can break in the region of the notch and allow venting of gas by way of the assigned battery-module housing vent 36.

The preferably provided contact between the first cooling plate wall 91 and the second cooling plate wall 92 in the region of the closure arrangement 38 is advantageous because a defined force transmission can take place from the second cooling plate wall 92 to the outer first cooling plate wall 91 and, as a result, a defined destruction of the closure arrangement 38 is possible when there is excess pressure.

The region between the cell envelope 62 and the battery module housing 32 is preferably filled, at least in certain regions, with a heat-conducting paste 80, in order to allow a good heat transfer from the cell envelope 62 to the battery module housing 32. Preferably, in the region of the cell vent 66 and/or the battery-module housing vent 36, no heat-conducting paste is provided, at least in certain regions, in order to allow a free duct in the event of venting.

In the representation, two of the cell vents 66 (the second and fourth from the left) respectively lie at least opposite an assigned battery-module housing vent 36, and so at least in certain regions there is a straight connection between the cell vents 66 and the battery-module housing vent 36. The other two cell vents 66 (the first and third from the left) also respectively lie opposite an assigned battery-module housing vents 36. However, this cannot be seen in the chosen sectional plane, because they are arranged offset, cf. FIG. 7. The offset arrangement leads to an increased distance of the battery-module housing vents 36 from one another, and consequently to them having less of an influence on one another.

Lying opposite makes it possible for the gas that is produced in the event of a fault to escape directly through the cell vent 66 and the battery-module housing vent 36 to the outside. In the event of the occurrence of hot gases, the adjacent battery cells 60 are consequently exposed to less thermal and mechanical loading than when there is a large contiguous space between the battery cells 60 and the battery module housing 62. Moreover, a straight, and consequently direct, path to the outside is preferably possible for the gases occurring, at least in certain regions.

A plane 67 is schematically depicted, and all four cell vents 66 that are shown lie in this plane 67.

The cell vents 66 and the battery-module vents 36 may also be provided with a grating in order to prevent sizeable parts from getting out.

Figure 4:
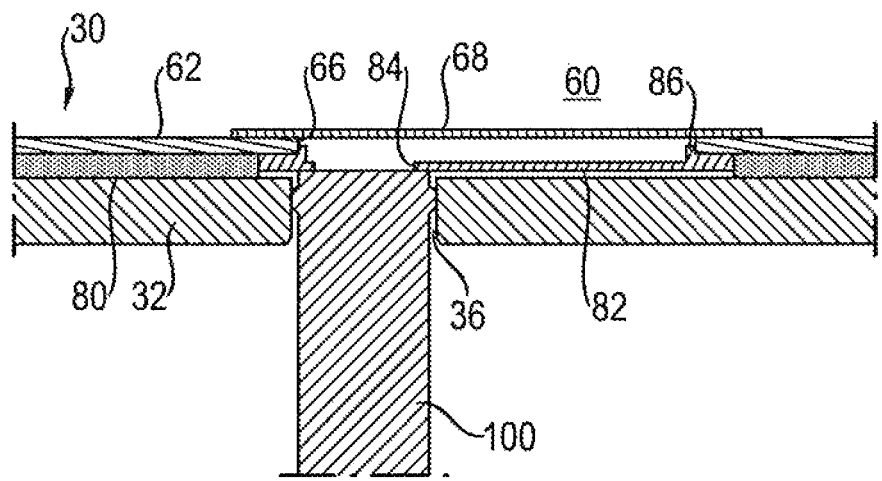
FIG. 4 shows a second embodiment of the battery module from FIG. 2 during a production step in a schematic cross section.

FIG. 4 shows a further embodiment of the battery module 30 in a cross section. A battery cell 60 is shown, with the associated cell envelope 62 and the closure arrangement 68. The cell vent 66 is assigned a cover part 82. The cover part 82 has a cover-part through-opening 84, and the cover part 82 is arranged, at least in certain portions, between the cell envelope 62 and the battery module housing 32. This produces an annular configuration of the cover part 82, while the cover part opening 84 may be round, but for example may also be square or octagonal. The cover part 82 preferably lies against the cell envelope 62. For this purpose, it may for example be adhesively bonded to the cell envelope 62. The cover-part through-opening 84 lies on a first side opposite the cell vent 66, at least in certain regions, and on a second side opposite the battery-module housing vent 36, at least in certain regions.

A plug 100 has been inserted into the battery-module housing vent 36 and lies against the cover part 82. As a result, during filling of the battery module 30 with the heat-conducting paste 80, penetration of the heat-conducting paste 80 into the region of the cell vent 66 and in the region of the battery-module housing vents 36 can be prevented, at least in certain regions.

The cover-part through-opening 84 is preferably smaller than the battery-module housing vents 36, and this makes it easier for the plug 100 to lie against the cover part 82. The cover-part through-opening 84 is preferably smaller than the cell vent 66, and as a result the outlet opening of the battery cells 60 can be defined more exactly.

Figure 5:
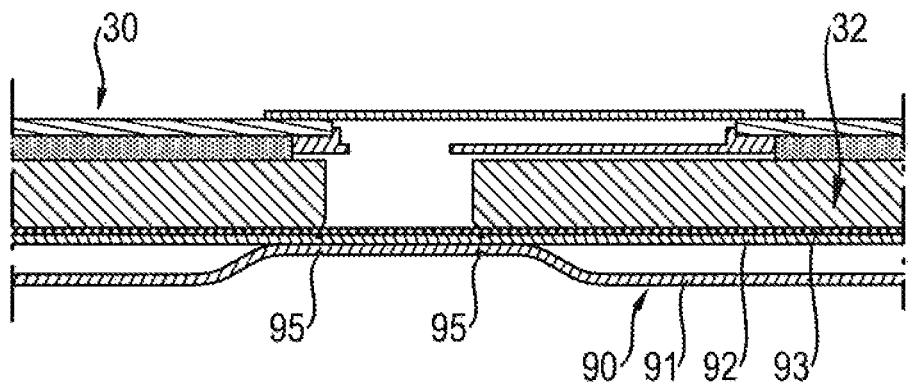
FIG. 5 shows the second embodiment of the battery module from FIG. 4 after production in a cross section.

FIG. 5 shows the battery module 30 from FIG. 4 after joining to the cooling plate 90. In the exemplary embodiment, the second cooling plate wall 92 is connected to the battery module housing 32 by way of an adhesive 93.

Figure 6:
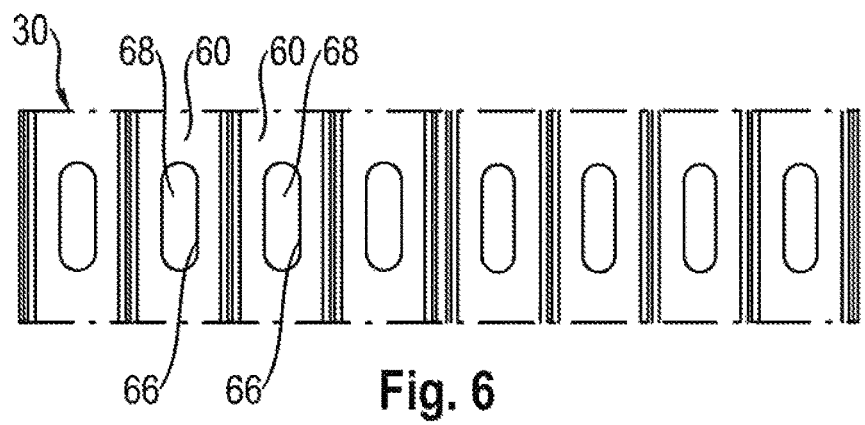
FIG. 6 shows the second embodiment of the battery module from FIG. 4 after a first production step in a plan view.

FIG. 6 shows a detail of the battery module 30 after a first production step. The battery cells 60 are stacked, and the cell vents 66 with the closure arrangements 68 are arranged next to one another in one plane.

Figure 7:
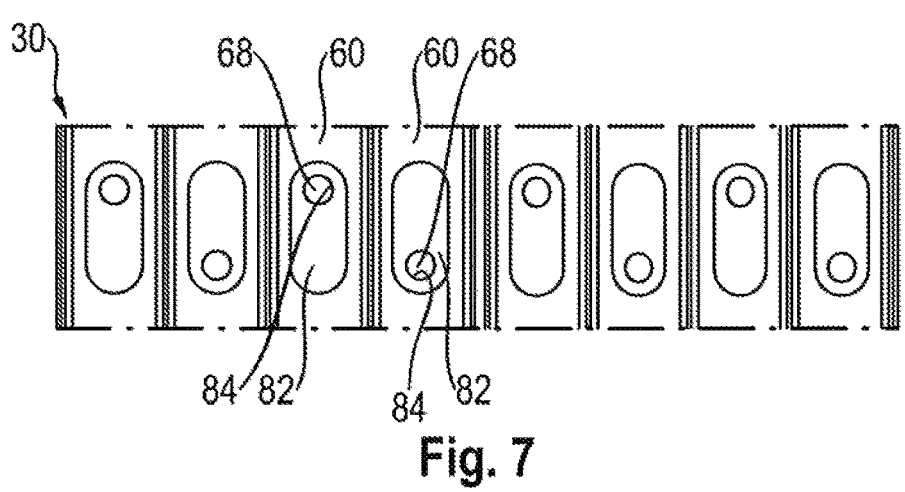
FIG. 7 shows the second embodiment of the battery module from FIG. 6 after a second production step.

FIG. 7 shows in a representation corresponding to FIG. 6 the battery module 30 after the cover parts 82 with the cover part openings 84 have been provided. The cover parts 82 may be provided differently, at least to some extent, in order thereby to achieve a lateral offset of the cover part openings 84.

Figure 8:
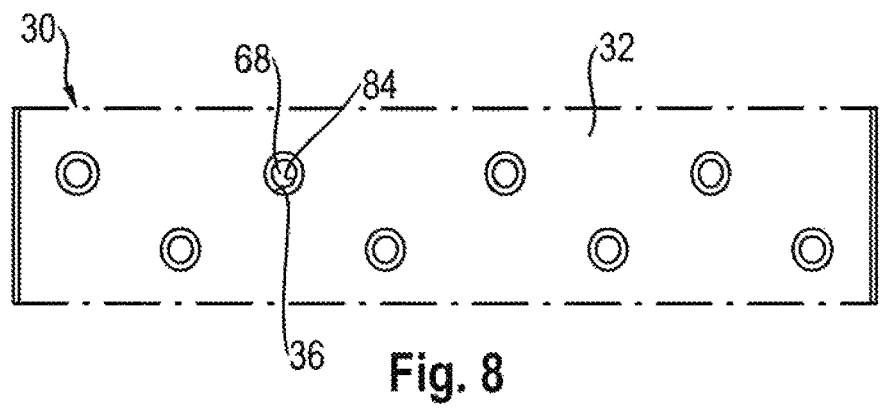
FIG. 8 shows the second embodiment of the battery module from FIG. 7 after a third production step.

FIG. 8 shows in a representation corresponding to FIG. 7 the battery module 30 after the battery module housing 32 with the battery-module housing vents 36 has been provided. The battery-module housing vents 36 lie opposite the cover part openings 84, and they allow direct venting of gas from the respective battery cell 60 through the cell vent 66, the cover part opening 84 and the battery-module housing vent 36. For each of the battery cells 60, at least one battery-module housing vent 36 is provided.

Figure 9:
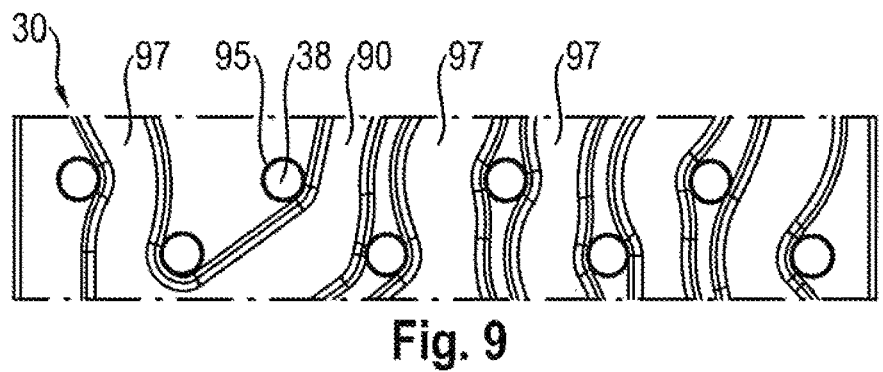
FIG. 9 shows the second embodiment of the battery module from FIG. 8 after a fourth production step.

FIG. 9 shows in a representation corresponding to FIG. 8 the battery module 30 after the cooling plate 90 has been provided. The closure arrangements 38 have the points 95 with reduced wall thickness, and these points 95 have in the exemplary embodiment a round contour. However, the contour may for example also be rectangular or polygonal. The cooling ducts 97 run along the cooling plate 90.

Of course, a variety of variations and modifications are possible within the scope of the present invention.

LIST OF DESIGNATIONS

10 Vehicle
20 Battery device
22 Battery control electronics
24 Battery terminals
26 Battery housing
30 Battery module
32 Battery module housing
34 Battery-module housing wall
36 Battery-module housing vent
38 First closure arrangement
60 Battery cell
61 Partition
62 Cell envelope
66 Cell vent
67 Plane
68 Second closure arrangement
70 Cell connector
80 Heat-conducting paste
82 Cover part
84 Cover-part through-opening
86 Collar
90 Cooling plate
91 First cooling plate wall
92 Second cooling plate wall
93 Adhesive
94 Coolant
95 Point with reduced wall thickness
96 Point with maximum wall thickness
97 Cooling duct

What is claimed is:
1. A battery device comprising:
at least one battery module having a battery module housing, the battery module housing having a battery-module housing wall with battery-module housing vents, which battery-module housing vents are each respectively assigned a first closure arrangement, thereby constituting a plurality of first closure arrangements, and battery cells disposed in the battery module housing, each battery cell having a cell envelope with a cell vent, wherein at least two of the cell vents respectively lie opposite an assigned battery-module housing vent, wherein, for each battery-module housing vent, the first closure arrangement closes the assigned battery-module housing vent in a first state (Z1) and opens the assigned battery-module housing vent in a second state (Z2) in order to allow at least partial venting of gas from the battery module housing through the assigned battery-module housing vent in the second state (Z2) of the first closure arrangement.

2. The battery device as claimed in claim 1, wherein the first closure arrangements are configured to carry out a changeover from the first state (Z1) to the second state (Z2) in dependence on a parameter from the group of parameters consisting of:
- a pressure in the battery module housing,
- a temperature in the battery module housing, and
- a gas concentration of a predetermined gas in the battery module housing.

3. The battery device as claimed in claim 1, wherein, in the first state, each first closure arrangement is configured to bring about an impermeability to media of the assigned battery-module housing vent.

4. The battery device as claimed in claim 1, in which the cell vents are respectively assigned a second closure arrangement, which second closure arrangement closes the cell vent in a third state (Z3) and opens the cell vent in a fourth state (Z4) in order to allow venting of gas from the battery cell through the assigned cell vent in the fourth state (Z4) of the second closure arrangement.

5. The battery device as claimed in claim 1, the battery device further comprising a cooling plate that forms at least two first closure arrangements of the plurality of first closure arrangements.

6. The battery device as claimed in claim 5, in which the cooling plate has a first cooling plate wall and a second cooling plate wall, which first cooling plate wall is maintained at a distance from the second cooling plate wall, in order to allow a coolant flow between the first cooling plate wall and the second cooling plate wall.

7. A battery device comprising:
at least one battery module having a battery module housing, the battery module housing having a battery-module housing wall with battery-module housing vents, which battery-module housing vents are each respectively assigned a first closure arrangement, thereby constituting a plurality of first closure arrangements,
battery cells disposed in the battery module housing, each battery cell having a cell envelope with a cell vent, wherein at least two of the cell vents respectively lie opposite an assigned battery-module housing vent, and
a cooling plate that forms at least two of the plurality of first closure arrangements,
wherein, for each battery-module housing vent, the first closure arrangement closes the assigned battery-module housing vent in a first state (Z1) and opens the assigned battery-module housing vent in a second state (Z2) in order to allow at least partial venting of gas from the battery module housing through the assigned battery-module housing vent in the second state (Z2) of the first closure arrangement,
wherein the cooling plate has a first cooling plate wall and a second cooling plate wall, which first cooling plate wall is maintained at a distance from the second cooling plate wall, in order to allow a coolant flow between the first cooling plate wall and the second cooling plate wall, and
wherein the first cooling plate wall and the second cooling plate wall are in contact with one another in the region of at least one of the first closure arrangements.

8. The battery device as claimed in claim 6, wherein, (i) the first cooling plate wall, (ii) the second cooling plate wall, or (iii) the first cooling plate wall and the second cooling plate wall, have a reduced wall thickness in a region of at least one of the first closure arrangements, as compared with a maximum wall thickness of the respective cooling plate wall, in order to allow breaking open of the at least one of the first closure arrangements under a predetermined pressure in a region of the reduced wall thickness.

9. The battery device as claimed in claim 1, further comprising heat-conducting paste disposed in a region between the cell envelopes and the battery module housing.

10. The battery device as claimed in claim 9, in which the battery-module housing vents are free from heat-conducting paste.

11. The battery device as claimed in claim 9, in which the cell vents are free from heat-conducting paste.

12. The battery device as claimed in claim 1, in which the cell vents are assigned a covering part, which covering part has a covering-part through-opening, which covering part is arranged between the cell envelope and the battery module housing, and which covering-part through-opening lies on a first side opposite the assigned cell vent and on a second side opposite the assigned battery-module housing vent, in order to allow venting of gas from an inside of a battery cell to an outside of the battery module housing along a straight path.

13. The battery device as claimed in claim 12, wherein the cover-part through-opening is smaller than the battery-module housing vent.

14. A battery device comprising:
at least one battery module having a battery module housing, the battery module housing having a battery-module housing wall with battery-module housing vents, which battery-module housing vents are each respectively assigned a first closure arrangement, thereby constituting a plurality of first closure arrangements, and
battery cells disposed in the battery module housing, each battery cell having a cell envelope with a cell vent, wherein at least two of the cell vents respectively lie opposite an assigned battery-module housing vent,
wherein, for each battery-module housing vent, the first closure arrangement closes the assigned battery-module housing vent in a first state (Z1) and opens the assigned battery-module housing vent in a second state (Z2) in order to allow at least partial venting of gas from the battery module housing through the assigned battery-module housing vent in the second state (Z2) of the first closure arrangement,
wherein the cell vents are assigned a covering part, which covering part has a covering-part through-opening, which covering part is arranged between the cell envelope and the battery module housing, and which covering-part through-opening lies on a first side opposite the assigned cell vent and on a second side opposite the assigned battery-module housing vent, in order to allow venting of gas from an inside of a battery cell to an outside of the battery module housing along a straight path, and wherein the cover-part through-opening is smaller than the cell vent, and wherein a middle of the cover-part through-opening is offset from a middle of the cell vent.

15. The battery device as claimed in claim 1, wherein at least three cell vents lie in one plane.

16. The battery device as claimed in claim 1, wherein the battery module has a first number of the battery cells, and the battery module housing has a second number of battery-module housing vents, the second number corresponding to at least 100% of the first number.

17. A vehicle comprising the battery device as claimed in claim 1.

18. The vehicle as claimed in claim 17, in which the cell vents are disposed on an underside of the battery cells.

19. The vehicle as claimed in claim 17, in which the battery-module housing vents are disposed on an underside of the battery module housing.

* * * * *